United States Patent
Terwart et al.

(10) Patent No.: US 8,366,585 B2
(45) Date of Patent: Feb. 5, 2013

(54) SYNCHRONOUS STATE DETERMINATION METHOD FOR AUTOMATIC DUAL CLUTCH TRANSMISSION

(75) Inventors: Markus Terwart, Thundorf (DE); Mario Bühner, Gerolzhofen (DE); Karl Locher, Prongstetten-Tigerfeld (DE); Martin-Joachim Bader, Mochenwangen (DE); Dietmar Zuber, Rödental (DE); Olaf Moseler, Werneck (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 685 days.

(21) Appl. No.: 12/610,565

(22) Filed: Nov. 2, 2009

(65) Prior Publication Data
US 2010/0113217 A1   May 6, 2010

(30) Foreign Application Priority Data
Nov. 3, 2008   (DE) .......................... 10 2008 043 385

(51) Int. Cl.
*B60W 10/00* (2006.01)
(52) U.S. Cl. ........................................................ 477/80
(58) Field of Classification Search .................. 477/80, 477/79, 174, 175, 176; 74/330, 339, 340; 701/67, 68; 192/3.55, 103 R, 3.63
See application file for complete search history.

(56) References Cited

U.S. PATENT DOCUMENTS

| | | | |
|---|---|---|---|
| 2007/0208480 A1 | 9/2007 | Disch-Simon et al. | |
| 2009/0031836 A1* | 2/2009 | Diemer et al. | 74/339 |
| 2009/0192018 A1* | 7/2009 | Hoffmeister et al. | 477/176 |
| 2009/0306864 A1* | 12/2009 | Tamori | 701/51 |

FOREIGN PATENT DOCUMENTS

| | | |
|---|---|---|
| DE | 199 53 937 A1 | 5/2001 |
| DE | 101 10 898 A1 | 9/2001 |
| DE | 101 36 731 A1 | 2/2003 |
| DE | 10 2004 017 794 A1 | 10/2005 |
| EP | 02 01 570 B1 | 4/1989 |
| EP | 1 067 008 A2 | 1/2001 |
| EP | 21 48 116 A1 | 1/2010 |
| WO | 01/14761 A1 | 3/2001 |
| WO | 03/074895 A2 | 9/2003 |
| WO | 2004/076225 A1 | 9/2004 |

\* cited by examiner

*Primary Examiner* — David D Le
*Assistant Examiner* — David J Hlavka
(74) *Attorney, Agent, or Firm* — Davis & Bujold, PLLC (57) ABSTRACT

A method for determination of the synchronization point of an automatic double clutch transmission comprising two component transmissions each with one input shaft that connects via a friction clutch to the drive shaft of a motor and several gears, each shifted via a friction-synchronized gear clutch. The method includes the steps of selecting the gear clutch of a gear of a momentarily load-free component transmission; moving the associated gear setter to the neutral position as needed; successive movement of the associated gear setter in the direction of the shifting position of the selected gear until synchronous running is attained on the gear clutch within an applicable threshold; determination of the current synchronization point of the gear clutch from the current adjustment parameter of the associated gear setter; and adaptation of the valid synchronization point of the gear clutch to the current synchronization point.

32 Claims, 5 Drawing Sheets

SYNCHRONOUS STATE DETERMINATION METHOD FOR AUTOMATIC DUAL CLUTCH TRANSMISSION

This application claims priority from German patent application serial no. 10 2008 043 385.03 filed Nov. 3, 2008.

FIELD OF THE INVENTION

The invention relates to a method for determination of the synchronization point of an automatic double clutch transmission comprising two component transmissions, each with one input shaft connectable, via a friction clutch, to the drive shaft of a drive motor and several gears, each shiftable via a friction-synchronized gear clutch, whereby when the drive motor is running, a current value of the synchronization point of the associated gear setter is determined by approaching synchronization of a gear clutch and determining a significant change of at least one relevant operating parameter.

BACKGROUND OF THE INVENTION

Automatic shift transmissions with automatic double clutch transmissions are mostly provided with friction-synchronized gear clutches which can be activated, that is, engaged and disengaged respectively, through an actuatable gear setter and associated transmission elements, such as, for example, a shifting fork engaging with the respective gear setter on the one hand, and on the other hand through a shifting fork engaging in a gearshift sleeve of a shifting package including two gear clutches. In order to engage one gear, the associated gear setter is initially moved out of a neutral position to a synchronous position and the synchronization element of the gear clutch usually comprising two conical synchronizing rings is acted upon by a synchronizing adjustment force. In this way, a friction torque is generated in the synchronization element under the action of which the associated input shaft is accelerated or decelerated to the output side rotational speed of the gear clutch.

When synchronous running on the gear clutch is reached, the gear clutch can be engaged through a further displacement of the gear setter in the direction of the respective shifting position, owing to which the relevant gear is engaged by producing a positive-fit, non-rotational connection between a loose wheel of the relevant gear wheel set and the associated transmission shaft.

In order to guarantee rapid, comfortable, and low-wear engagement of the gears of an automatic step transmission, an exact as possible knowledge of the respective synchronization point is necessary. Furthermore, the accuracy of the method for determination of the operating parameters at which the synchronization element of a gear clutch is activated and the value of the engaged synchronous torque used to determine an operating parameter depends upon the exact knowledge of the synchronization point of the activated gear clutch.

A corresponding method is described, for example, in WO 2004/076 225 A1, in which initially the friction clutch of the load-free component transmission is partially engaged for adaptation of the clutch characteristics of a double clutch transmission. After reaching synchronous running on the friction clutch, the synchronization point of the gear clutch of a gear of the same component transmission is approached, and then the synchronization element of the gear clutch is acted upon with a rising adjustment force until the synchronous running is cancelled on the friction clutch. In order to ascertain the contact point of the friction clutch, the current value of the synchronous torque of the gear clutch is assigned to the clutch torque engaged on the friction clutch, so that the exact knowledge of the synchronous torque depending on the synchronization point determines the accuracy of the contact point obtained.

Accordingly, the synchronization point of a gear clutch or a gear setter is understood to mean the corresponding value of a relevant adjusting parameter of the gear setter or an associated transmission element, as for example the synchronization position of a gear shift bar or the synchronization pressure of a gear setter configured as a pressure setting cylinder, at which synchronization of the relevant gear clutch is approached and acted upon by an adjustment force for synchronization. Since the synchronization elements of gear clutches of an automatic step gear shift can be constructed differently and differ from one another due to finishing tolerances as well as different wear and tear even with identical construction, a gear-specific determination of the respective synchronization point is necessary.

In a known method for activation of an automatic gear shift according to DE 101 10 898 A1, the transmission parameters necessary for selecting and shifting are determined on a testing stand before installing the gear shift in a motor vehicle. In order to determine the synchronization position of the gear setter or the respective gear shift bar, it is provided that the input shaft is set in rotation, that a change in rotational speed of the input shaft is monitored, and that with activation of a gear setter in the direction of a shifting position, the attainment of the relevant synchronization position is determined on the basis of a rotational speed change of the output shaft lying above a predetermined threshold value.

A method for determination of a synchronization point in an automatic gearshift is known from DE 101 36 731 A1 in which an operating parameter that determines the adjustment force of the associated gear setter, such as, for example, the adjusting current of an electric motor, is obtained when the gear is engaged, and the relevant synchronization point is obtained on the basis of a significant rise of this operating parameter.

A method for shift optimization of an automatic transmission is proposed in DE 10 2004 017 794 B4, in which the second time derivative of the input shaft rotational speed is determined in connection with a shifting procedure during travel when engaging the target gear, and the synchronization point of the associated gear clutch is obtained on the basis of a significant change of this derivative of the input shaft rotational speed. Alternatively or additionally, the synchronization point of a gear clutch can also be obtained on the basis of a recorded change in the adjustment speed of the gear setter or the adjustment parameter of the gear setter, such as the adjusting current of an electric motor or the adjustment pressure of a pressure adjusting cylinder.

SUMMARY OF THE INVENTION

Since the known methods relate to automatic gear shifts with only one input shaft, these methods cannot be transferred without further ado to a double clutch transmission with two input shafts. The object of the present invention is therefore to disclose a method for ascertaining the synchronization point of an automatic double clutch transmission of the type mentioned at the beginning, which takes into consideration the specific circumstances of a double clutch transmission and makes possible, with relatively simple control sequences, an exact determination of the synchronization point of gear clutches.

This object is achieved in that, in order to determine the synchronization point of an automatic double clutch transmission, which includes two component transmissions with respectively one input shaft connectable with the drive shaft of a drive motor through a friction clutch and several gears shiftable over respectively one friction-synchronized gear clutch, a current value of the synchronization point of the associated gear setter is determined with the drive motor running by approaching synchronization of a gear clutch and determining a significant change of at least one relevant operating parameter with the following steps:

a) Selection of the gear clutch of a gear of a momentarily load-free component transmission, b) Displacement of the associated gear setter to the neutral position as needed, c) Successive displacement of the associated gear setter in the direction of the shifting position of the selected gear until synchronous running is attained on the gear clutch within an applicable threshold, d) Determination of the current synchronization point of the gear clutch from the current adjustment parameter of the associated gear setter, e) Adaptation of the valid synchronization point of the gear clutch to the current synchronization point.

By approaching or initiating synchronization of the selected gear clutch of the load-free component transmission, the input-side portion of the relevant component transmission, which includes the associated input shaft, is accelerated or decelerated when the synchronization point is reached under the action of the synchronous torque, set in the synchronization of the gear clutch, on the output side rotational speed of the gear clutch. That is, synchronous running is produced on the gear clutch.

The rotational speeds to be compared for this purpose, namely the input-side rotational speed of the gear clutch and the output-side rotational speed of the gear clutch, can be derived in a manner known per se by means of the gear ratios of the gear, which may also be termed a synchronization gear, of the relevant gear clutch and the driving gear engaged in the other component transmission from the rotational speeds of the two input shafts.

With an arrangement of the relevant gear clutch on the input shaft, the input-side rotational speed of the gear clutch is identical to the rotational speed of the associated input shaft, and the output-side rotational speed of the gear clutch, which also may be termed the synchronization rotational speed, results from the rotational speed of the other input shaft by division by the gear ratio of the driving speed engaged in the other component transmission and multiplication by the gear ratio of the synchronous gear. By the recognition of synchronous running on the gear clutch, the current synchronization point of the gear clutch is consequently determined relatively exactly from the current adjustment parameter of the associated gear setter, by which the valid synchronization point can be adapted according to known methods, such as, for example, weighted averaging with previously obtained values of the synchronization point. In contrast to most known methods, this adjustment parameter is not the adjustment path but the adjustment force or an equivalent actuating variable of the gear setter, such as for instance the adjustment pressure of a gear setter configured as a hydraulic or pneumatic adjustment cylinder or the adjustment current or the adjustment voltage of a gear setter configured as an electric motor.

The method of the invention for determining the synchronization point of an automatic double clutch transmission has a relatively simple control sequence, and therefore requires but a small period of time. Likewise the method of the invention does not require any additional equipment expense, since recourse is made only to the sensor data of rotational speed and adjustment parameter sensors which are available in any case.

A current synchronization point can be determined, and the valid synchronization point of a gear clutch can be promptly adapted when the motor vehicle is standing still, in each case for at least one gear of both component transmissions, whereby a temporally serial sequence as well as a temporally parallel sequence for determining the current synchronization point of both gear clutches is possible, since toward this end no gear need be engaged in the other component transmission.

In order not to impair the current driving operation, the current synchronization point should be determined and the valid synchronization point of a gear clutch adapted during travel for at least one gear of a momentarily load-free component transmission.

To assure a problem-free method sequence, it is provided in a preparatory phase of the method that, prior to determining a current synchronization point of a gear clutch, its degree of engagement is initially verified, and the relevant friction clutch is completely disengaged in the case of a partially engaged state, and that the shifting state of the relevant component transmission is initially verified and the relevant gear is disengaged in the event of an engaged gear.

Since the adjustment of synchronous running on a gear clutch can be attributed to the synchronous torque of the gear clutch rendered effective due to the approach of the current synchronization point only when there is an initially existing, sufficiently high rotational speed difference, in order to increase a possibly too low rotational speed difference on the gear clutch, it can be provided that, prior to determining a current synchronization point of a gear clutch, without verification of the actually existing rotational speed difference, the associated friction clutch can be partially engaged, and after an applicable pause fully re-engaged, for temporary setting of a preset minimal rotational speed difference on the gear clutch with an applicable degree of engagement as a precaution, as for example by filling a pressure adjustment cylinder with a filling pressure specified for this.

Alternatively, however, it can also be provided that prior to determining a current synchronization point of a gear clutch, it is verified whether an applicable minimum rotational speed difference exists on the relevant gear clutch, that is, a minimal rotational speed difference adaptable to the respective application, and that the associated friction clutch is partially engaged and again wholly disengaged when there is a too low rotational speed difference on the gear clutch for setting the minimum rotational speed difference.

For this purpose, the associated friction clutch with an applicable degree of engagement is partially engaged and then again completely disengaged when the rotational speed difference on the gear clutch reaches or exceeds the minimum rotational speed difference within an applicable pause, or if the pause has expired.

If the pause has expired without reaching or exceeding the minimum rotational speed difference, determination of a current synchronization point of a gear clutch is best interrupted, and the degree of engagement of the associated friction clutch is increased with a subsequent determination of a current synchronization point of the same gear clutch.

If the rotational speed difference on the gear clutch reaches or exceeds the minimum rotational speed difference within the applicable pause, but subsequently again falls below the minimum rotational speed difference within an established waiting period, determination of current synchronization point is likewise best interrupted, and the associated friction clutch remains partially engaged for generating a drag torque preferably during a successive determination of a current synchronization point of the same gear clutch.

As regards the selection of the particular gear clutch, it can be provided that the gear clutch of the gear of the load-free component transmission that has gone the longest time since adaptation of the valid synchronization point, that is, the one for whose gear clutch there is no current control data, is specified for determining a current synchronization point. It also makes sense, however, that the gear clutch of the gear of the load-free component transmission that is likely to be engaged next during shifting be specified for determining a current synchronization point, so that quite current control data are available for its gear clutch.

However, if determination of the contact point of a friction clutch using the synchronization torque of an associated gear clutch is imminent, in order to increase the accuracy of this procedure, preferably the gear clutch of the gear whose gear clutch is provided for a subsequent determination of the contact point of the associated friction clutch of the load-free component clutch is specified for determining a current synchronization point.

The approach of the current synchronization point of a gear clutch can occur in a step-wise increase in the adjustment parameter of the associated gear setter with an applicable step offset and an applicable pause duration per engagement step. This means, for example, that the adjustment pressure of a gear setter configured as a hydraulic or pneumatic adjustment cylinder is raised abruptly per engagement step by the step offset, and this adjustment pressure in each case is kept constant over the duration of the pause until synchronous running is recognized on the relevant gear clutch, that is, the associated synchronization point is obtained.

Alternatively, the approach of the current synchronization point of a gear clutch can also occur in a ramping stepwise increase of the adjustment parameters of the relevant gear setter with an applicable step offset, an applicable pause duration, an applicable ramp time, and an applicable ramp gradient per engagement step. With this type of adjustment force increase, the abrupt increase of the adjustment parameter is in each case diminished by the ramp function determined by the ramp time and the ramp gradient, or the irregular transition of the leading edge is rounded into the region of the constant adjustment parameter.

A further possibility for the stepwise approach of the current synchronization point of a gear clutch consists in an impulse stepwise increase of the adjustment parameter of the relevant gear setter with an applicable step offset, an applicable pause duration, an applicable impulse gradient, and an applicable shut-off duration per engagement step. With this type of adjustment force increase, a shut-off of the adjustment force over the shut-off duration and a subsequent abrupt increase of the adjustment parameter to a higher value in comparison with the previous increase by the step offset follows the increase of the adjustment parameter occurring with the impulse gradient and stabilization of the adjustment parameter for the duration of the pause as long as the synchronization point has not yet been determined.

The step offset of the adjustment parameter in each case can be held constant up until determination of the current synchronization point per engagement step, but for a value of the step offset must be determined, which represents a compromise solution in respect to a rapid as possible and at the same time an exact as possible determination of the synchronization point.

In this respect, it is more advantageous if the step offset of the adjustment parameter is reduced in each case based on a relatively high initial step offset until determination of the current synchronization point per engagement step by a specified step decrement. Through the initially high step offset of the adjustment parameter, the gear setter or an associated shifting rod is moved relatively rapidly into the vicinity of the synchronization point of the gear clutch, owing to which the process sequence is accelerated. Through the subsequently stepwise reduced step offset of the adjustment parameter, the gear setter or the associated shifting rod approaches the synchronization point of the gear clutch in increasingly small steps, owing to which the accuracy of the obtained synchronization point is increased.

Alternatively to a stepwise increase, the approach of the current synchronization point of a gear clutch can however also occur in a continuous ramp-like increase of the adjustment parameter of the relevant gear setter with an applicable adjustment gradient.

The adjustment gradient of the adjustment parameter can be held constant up to determination of the synchronization point, but this represents a compromise solution with respect to the speed and accuracy of the process.

For the reasons mentioned above, it is therefore more advantageous if the adjustment gradient of the adjustment parameter is reduced proceeding from a relatively high initial adjustment gradient in an applicable time cycle by a specified gradient decrement until the synchronization point is determined.

In order to avoid inadvertent switching of the gear clutch to the shifting position, that is, engagement of the associated gear, it is provided that the determination of a current synchronization point of a gear clutch is discontinued if during moving of the associated gear setter, a specified limit value of the adjustment parameter is reached or exceeded. In this way, consequently, the adjustment position of the gear setter of the associated shifting rod is indirectly monitored.

Likewise, it is useful to discontinue determination of a current synchronization point of a gear clutch if, during movement of the associated gear setter, a specified synchronization time is reached or exceeded, since then there is obviously a defect in the gear setter or the gear clutch.

To increase the reliability of the obtained current synchronization point and thus the increase in accuracy of adaptation of the valid synchronization point, it can be provided that the successful determination of a current synchronization point of a gear clutch is repeated at least once for a short time, and the obtained synchronization point is only used for adaptation of the valid synchronization point only when the at least two determined values of the synchronization point agree with each other within specified tolerance limits.

If the adjustment parameter of the relevant gear setter is increased by steps in the approach of the synchronization point, especially with constant step offset, in order to increase the accuracy of the obtained synchronization point, it is helpfully provided that upon repetition of determination of a current synchronization point of a gear clutch, the step offset of the adjustment parameter is reduced at the latest beginning with the last engagement step of the preceding determination of the same synchronization point.

In order to increase the accuracy of the obtained synchronization point, it is likewise advantageous, in connection with a ramp-wise approach of the synchronization point, especially with a constant adjustment gradient, if during a repetition of determination of a current synchronization point of a gear clutch, the adjustment gradient of the adjustment parameter is reduced at the latest beginning with the last time cycle of the previous determination of the same synchronization point.

For identification of a defect on a gear setter or a gear clutch in the framework of trouble shooting, it is preferably provided that following an applicable number of interruptions of determination of a current synchronization point of the same gear clutch, a gear-related error message is stored in an error memory of a control apparatus, and the relevant gear clutch is blocked, at least for special functions such as, for example, determining the contact point of the associated friction clutch.

In order to allow a problem-free process sequence, the determination of a current synchronization point of a gear clutch should only be started when there is largely stationary operation of the relevant motor vehicle, and should be interrupted when an operating event that disturbs or cancels stationary operation occurs. A deflection change of the accelerator by the driver, or a change in power demand triggered by a speed regulation device, a braking maneuver triggered by driver's side activation of a brake pedal or by a braking assistant, and a shifting command triggered manually by the driver or automatically by an associated transmission control device, for example, are to be regarded as disturbing operating events in this sense. Likewise, fluctuations in coolant volume flow and transmission fluid temperature of the double clutch transmission, as well as changes in motor torque and motor rotation speed of the drive motor leading to departure from specified tolerance limits, can also be interpreted as disturbing operating events.

A poor road surface condition of the stretch of road traveled during the process sequence can also have negative effects on the process result due to arising vibrations. It is therefore useful for the road surface condition to be determined while driving using suitable sensors such as, for example, acceleration sensors arranged on chassis elements and/or on the body of the relevant motor vehicle, and when a bad stretch is recognized, for determination of the synchronization point of a gear clutch to be discontinued.

On the other hand, the sequence of the invention method can also have disturbing effects on other control sequences occurring right in the power train. This applies particularly to a driving simulation on a roller test stand in which usually the consumption and exhaust behavior of a motor vehicle is determined or tested without the simulation of major vibrations. To avoid a negative influence of the method of the invention on a test in progress, during driving operations, helpfully a drive on a roller test stand is simulated using suitable sensors, and upon recognition of a roller test stand drive, determination of a current synchronization point of a gear clutch is discontinued.

To restore the initial state or to produce an operating state requested in the meantime, after a successful determination and after discontinuation of determination of a current synchronization point, the friction clutch is completely disengaged, the relevant gear setter is moved to its neutral position, and the previously disengaged gear or a gear requested in the meantime is engaged as needed.

Since the synchronizing rotational speed difference and the direction of synchronization, that is, the acceleration or deceleration of the input-side of the relevant component transmission to be conducted, in each case are dependent on the driving gear just engaged in the other component transmission, the adapted synchronization point of the gear clutch is usefully stored in parameterized form as a function of the driving gear engaged in the other component drive and the target gear synchronized to obtain a current synchronization point.

BRIEF DESCRIPTION OF THE DRAWINGS

Drawings with exemplary embodiments are appended to the description for clarification of the invention, wherein.

DETAILED DESCRIPTION OF THE PREFERRED EMBODIMENTS

Figure 5:
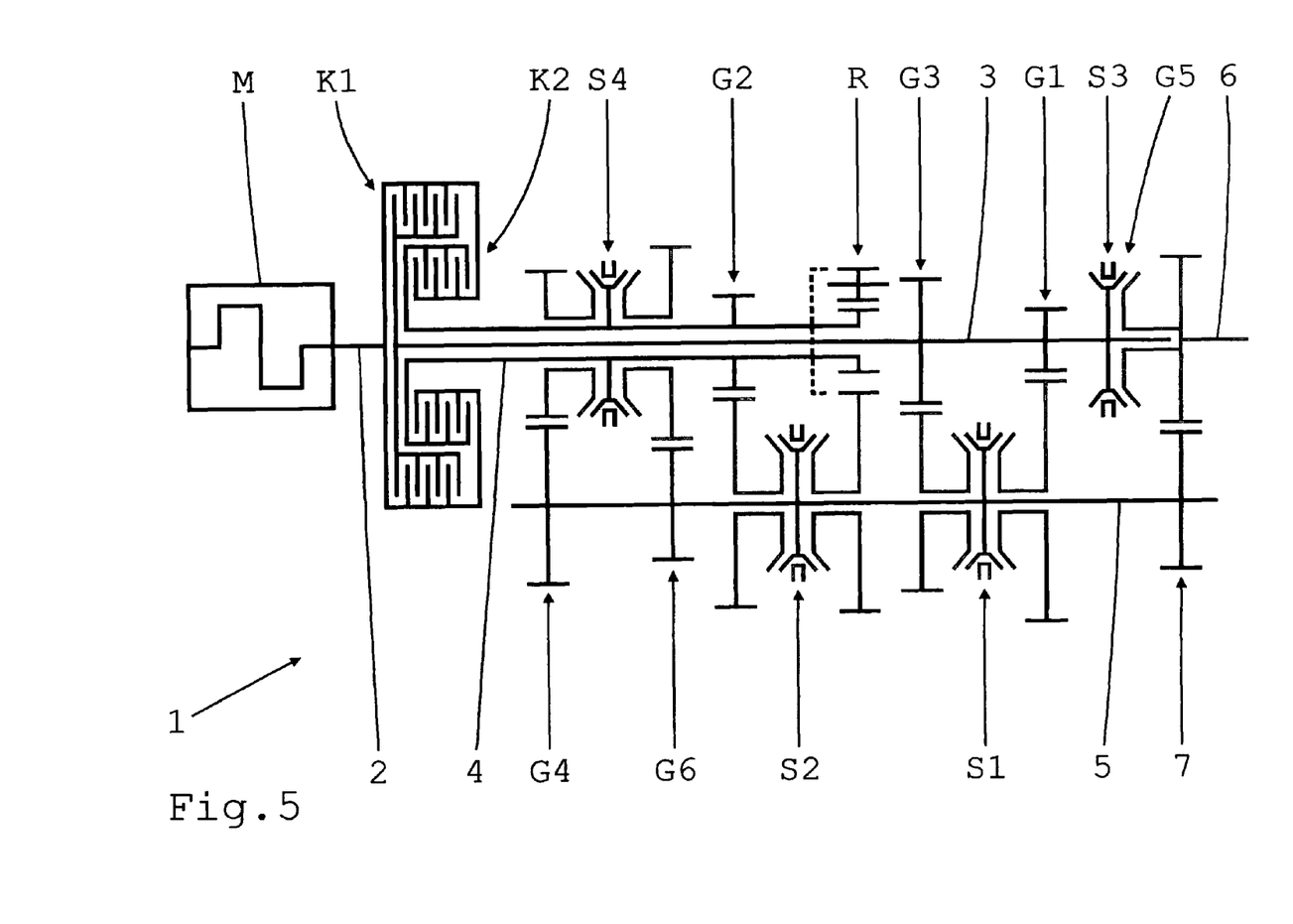
FIG. 5 is a schematic representation of a double clutch transmission.

A double clutch transmission 1 known per se, in which the method of the invention can be used to adapt the clutch characteristics, is illustrated in a simplified schematic form in FIG. 5. The double clutch transmission 1 features a longer first input shaft 3, a shorter second input shaft 4 constructed as a hollow shaft and arranged coaxially over the first input shaft 3, a countershaft 5 arranged coaxially in relation to the two input shafts 3, 4, and an output shaft 6 arranged coaxially as well as axially adjacent to the first input shaft 3.

The first input shaft 3 can be connected to the countershaft 5 by engaging one associated gear clutch via the gear wheel sets of a first forward gear G1 and a third forward gear G3, the countershaft being drive-connected to the output shaft 6 via an output step 7 formed from two fixed wheels.

The gear wheel sets of the first and third forward gears G1, G3 are each formed by a gear wheel pair with a fixed wheel arranged rotationally fixed on the first input shaft 3 and a loose wheel rotationally arranged on the countershaft 5. The gear clutches provided for shifting-induced connection of the loose wheels to the countershaft 5 are constructed as friction-synchronized, and are combined in a first shifting set S1 with two shift positions and a neutral position.

The fifth forward gear G5 here constructed as a direct gear by way of example can be shifted by establishment of a direct-drive connection of the first input shaft 3 to the output shaft 6 via an associated friction-synchronized gear clutch, which is the sole component of a third shifting set S3 arranged on the output end of the first input shaft 3, with a single shift position and a neutral position. On the input side, the first input shaft 3 can be connected to the drive shaft 2 of a drive motor M constructed as an internal combustion piston motor via a first friction clutch K1 constructed as an actively engageable multiple disk clutch.

The second input shaft 4 can be connected to the countershaft 5 by engagement of an associated gear clutch via the gear wheel sets of a second forward gear G2, a fourth forward gear G4, a sixth forward gear G6, and a reverse gear R. The gear wheel set of the second forward gear G2 is formed by a gear wheel pair with a fixed wheel arranged in a rotationally fixed manner on the second input shaft 4 and a loose wheel rotationally arranged on the countershaft 5. The gear wheel set of the reverse gear R includes an intermediate wheel for reversing the direction of rotation, in addition to a fixed wheel arranged in a rotationally fixed manner on the second input shaft 4 and a loose wheel rotationally arranged on the countershaft 5. The gear clutches provided for shifting-induced connection of the loose wheels of the second forward gear G2 and the reverse gear R to the countershaft 5 are constructed in friction-synchronized manner, and are combined in a second joint shifting set S2 with two shift positions and a neutral position.

The gear wheel sets of the fourth and sixth forward gears G4, G6 are each formed by a gear wheel pair with a loose wheel rotationally arranged on the second input shaft 4 and a fixed wheel arranged in a rotationally fixed manner on the countershaft 5. The gear clutches of the fourth and sixth forward gears G4, G6 provided for shifting-induced connection of the loose wheels to the second input shaft 4 are constructed in a friction-synchronized manner and are combined in a fourth joint shift set S4 with two shift positions and a neutral position. The second input shaft 4 can be connected to the drive shaft 2 of the drive motor M via a second friction clutch K2 constructed as an actively engageable multiple disk clutch.

The first input shaft 3 together with the first friction clutch K1, the gear wheel sets, and the gear clutches S1, S3 of the odd forward gears G1, G3, G5 consequently forms a first component transmission, while the second input shaft 4 together with the second friction clutch K2 and the gear wheel sets and gear clutches S2, S4 of the even forward gears G2, G4, G6 and the reverse gear R form a second component transmission. Shifting between a driving gear (for example, G3) of the one component transmission and a target gear (for example, G4) of the other component transmission takes place after prior synchronization and engagement of the target gear G4 by means of synchronous engagement of the friction clutch K2 associated with the target gear G4, as well as disengagement of the friction clutch K1 associated with the driving gear G3, and consequently without interruption of tractive force.

In a shifting process, in order for the target gear, G4 for example, to be synchronized quickly and without wear and tear, an exact knowledge of the synchronization point of the associated gear clutch S4 or of the gear setter automatically activating the latter is necessary. With an embodiment of the gear setter as a hydraulic operating cylinder, apart from the corresponding value of the adjustment path, as provided by the invention, the value of the adjustment pressure $p_{GK}$ can also be used as the synchronization point $p_{Sync}$ at which the synchronization of the gear clutch S4 is attained, and the input shaft 4 is accelerated or decelerated within a specified period of time under the action of a synchronous torque $M_{Sync}$ to the rotational speed $n_{Sync}$ of the output side part of the gear clutch S4. To detect the relevant influences, such as operating temperature and the wear and tear status of the respective synchronization and of the associated gear setter, a current value of the synchronization point ($p_{Sync}$) of the gear clutches S1-S4 is usually ascertained at certain time intervals both when the vehicle is standing still and when the vehicle is moving, and thus an available valid synchronization point is adapted gear-specifically, that is, accordingly corrected.

Figure 3:
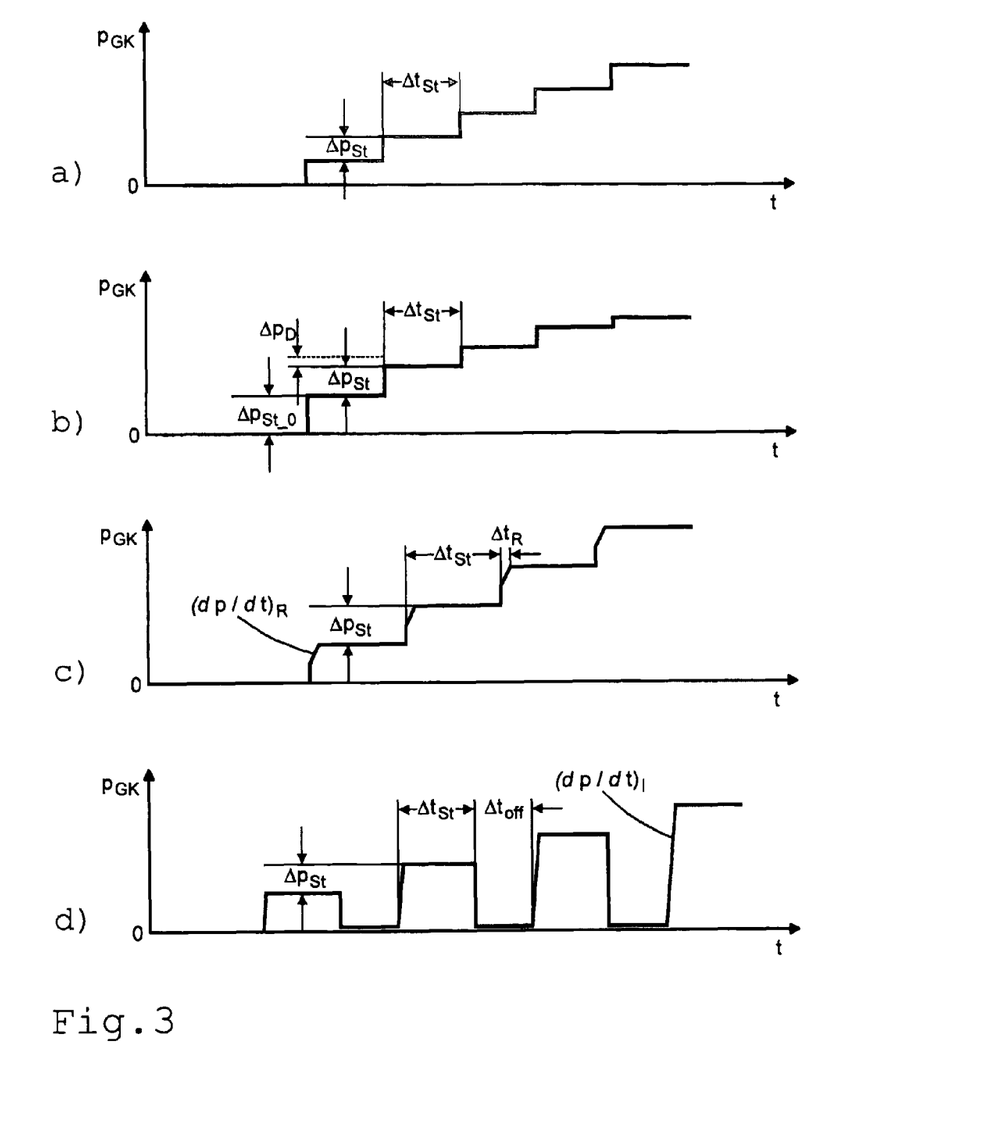
FIG. 3 shows examples for an approach of the synchronization point with a stepwise increase of the adjustment parameter of the associated gear setter.

The diagrams of FIG. 3 show stepwise time characteristics of the adjustment pressure $p_{GK}$, used as an adjustment parameter, for a gear setter configured as a hydraulic or pneumatic operating cylinder. These characteristics can be used to approach a gear coupling in order to obtain the relevant synchronization point $p_{Sync}$.

In the control curve of FIG. 3a, the adjustment pressure $p_{GK}$ of the relevant gear setter is increased per engagement step each time by a constant step offset $\Delta p_{St}$ and maintained over the pause duration $\Delta t_{St}$ until the synchronization point $p_{Sync}$ is reached or determined.

In the control curve of FIG. 3b, the adjustment pressure $p_{GK}$ is increased per engagement step each time by a variable step offset $\Delta p_{St}$ and maintained over the duration of the pause $\Delta t_{St}$ until the synchronization point $p_{Sync}$ has been attained or determined. Moreover the step offset $\Delta p_{St}$ is reduced based on a comparatively high initial step offset $\Delta p_{St\_0}$ per engagement step each time by a step decrement $\Delta p_D$, so that both the speed of determination of the synchronization point $p_{Sync}$ and the accuracy of the synchronization point $p_{Sync}$ obtained can be increased.

In a variant of a stepwise approach of the synchronization point $p_{Sync}$ according to FIG. 3c, the abrupt increase of the adjustment parameter $p_{GK}$ per engagement step is lessened each time by a ramp segment with the applicable magnitude of ramp gradient $(dp/dt)_R$ and ramp time $\Delta t_R$.

In a further preferred form of a stepwise approach of the synchronization point $p_{Sync}$ according to FIG. 3d, the increase of the adjustment parameter $p_{GK}$ per engagement step in each case is through a step impulse with an applicable impulse gradient $(dp/dt)_I$, an impulse height increase in comparison with the last impulse by an applicable step offset $\Delta p_{St}$, and an applicable pause duration $\Delta t_{St}$, as well as subsequent shut-off of the adjustment parameter $p_{GK}$ for an applicable shut-off duration $\Delta t_{off}$.

Figure 4:
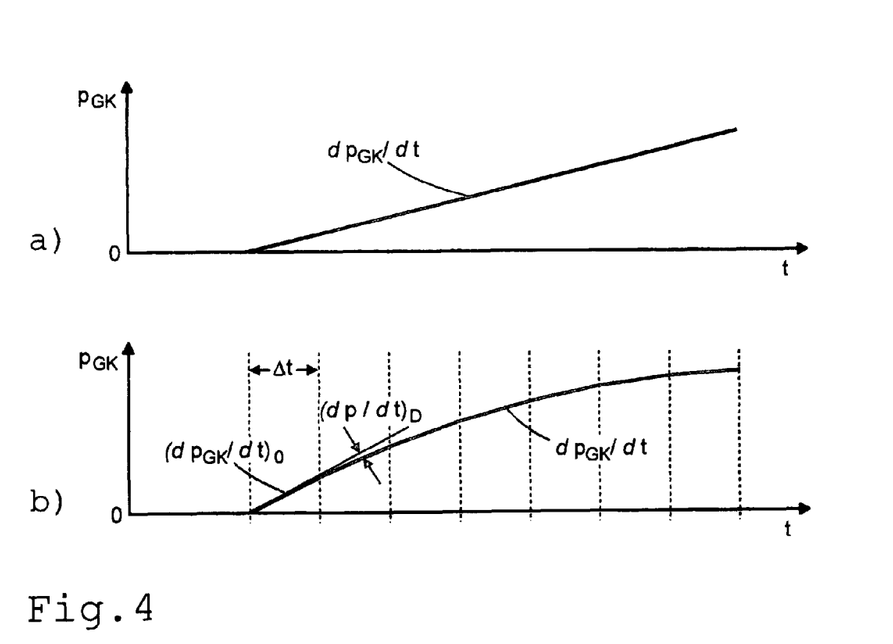
FIG. 4 shows examples for an approach of the synchronization point with a stepwise increase of the adjustment parameter of the associated gear setter.

On the other hand, the diagrams of FIG. 4 show ramp-like time characteristics of the adjustment pressure pSGK, used as an adjustment parameter, of a gear setter configured as a hydraulic or pneumatic operating cylinder. These can be used to approach a gear coupling in order to obtain the relevant synchronization point $p_{Sync}$.

In the control curve of FIG. 4a, the adjustment pressure $p_{GK}$ of the relevant gear setter is increased with a constant adjustment gradient $dp_{GK}/dt$ until the synchronization point $p_{Sync}$ is attained or determined.

In contrast to this, it is provided in the control curve per FIG. 4b that the adjustment pressure $p_{GK}$ of the relevant gear setter is increased based on a comparatively high initial adjustment gradient $(dp_{GK}/dt)_P$ by means of a reduction, occurring per the time cycle $\Delta t$ by a gradient decrement $(dp/dt)_D$, of the adjustment gradient $dp_{GK}/dt$ in a depressive course. With such a rise path of the adjustment pressure $p_{GK}$, both the speed of determination of the synchronization point $p_{Sync}$ as well as the accuracy of obtained synchronization point $p_{Sync}$ can be increased.

Figure 1:
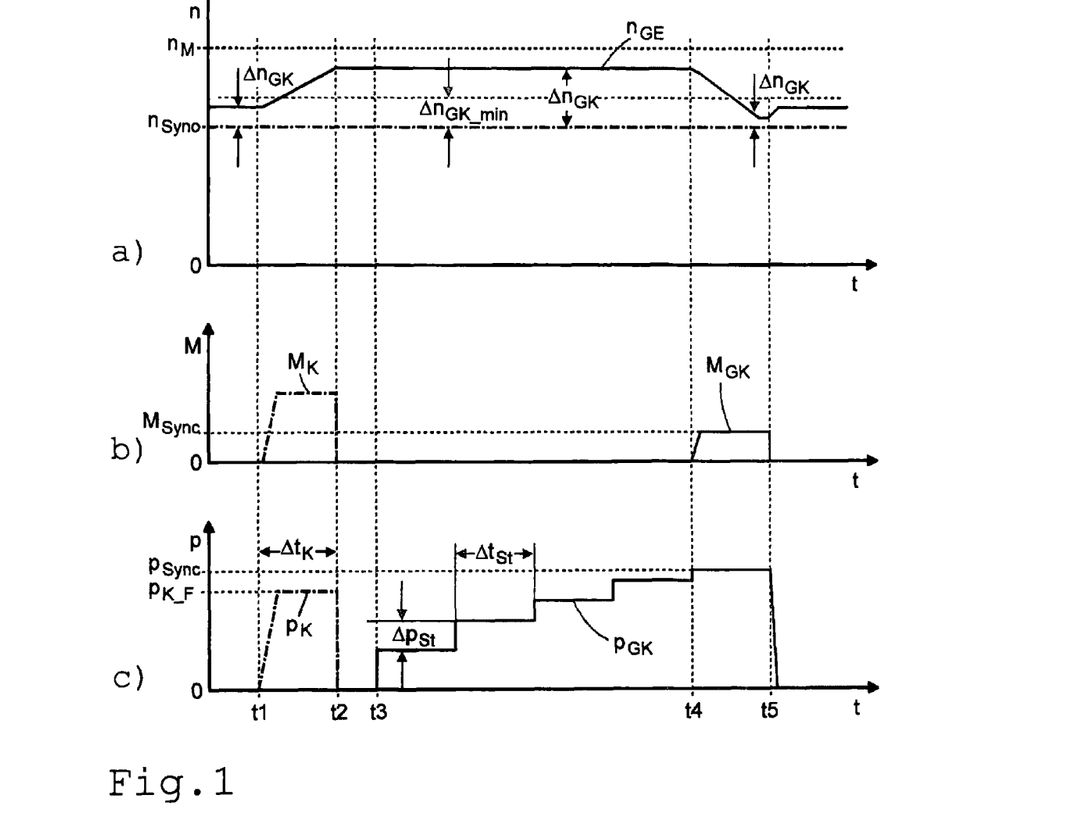
FIG. 1 is a time diagram with rotational speed, torque, and adjustment pressure curves according to a first variant of the method of the invention.

The diagrams of FIG. 1 provide a qualitative representation, based on time characteristics, of how during largely stationary driving, the current synchronization point $p_{Sync}$ of the gear clutch of a gear (for example G4) of the momentarily load-free component transmission is determined in accordance with a first variant of the method of the invention. For this purpose, in partial diagram a), the motor rotational speed $n_M$ of the drive motor M, the rotational speed $n_{GE}$ of the input shaft 4 of the load-free component transmission, and the rotational speed $n_{Sync}$ of the output side portion of the gear clutch are shown. In partial diagram b), the clutch torque $M_K$ of the associated friction clutch K2 and the friction torque $M_{GK}$ of synchronization of the gear clutch S4 is represented. And in partial diagram c), the adjustment pressures $p_K$, $p_{GK}$, presently used as adjustment parameters, of the clutch setter of friction clutch K2 and of the gear setter of gear clutch S4 are illustrated.

Since the rotational speed difference $\Delta n_{GK}$ on the gear clutch S4 initially lies below a minimal rotational speed difference $\Delta n_{GK\_min}$ established for determining the synchronization point $p_{Sync}$, starting at point t1, the clutch setter of the associated friction clutch K2 is initially acted on by a filling pressure $p_{K\_F}$, and in this way the friction clutch K2 is partially engaged, causing the input shaft 4 to be accelerated under the action of the adjusted clutch torque $M_K$ in the direction of the motor rotational speed $n_M$ of the drive motor M. After expiration of a pause $\Delta t_K$, a rotational speed difference $\Delta n_{GK}$ sufficient to determine the synchronization point $p_{Sync}$ is attained ($\Delta n_{GK} > \Delta n_{GK\_min}$), so that the friction clutch K2 is again completely disengaged at point t2.

Starting at point t3, the associated gear setter is moved from its neutral position in the direction of the shift position of the relevant gear G4. That is, the synchronization of the gear clutch S4 of gear G4 is successively approached. This takes place analogously to the control curve of FIG. 3b in a stepwise increase of the adjustment parameter $p_{GK}$ of the relevant gear setter with an applicable step offset $\Delta p_{St}$ and an applicable pause duration $\Delta t_{St}$ per engagement step, whereby the step offset $\Delta p_{St}$ of the adjustment parameter $p_{GK}$ is continuously reduced based on a relatively high initial step offset $\Delta p_{St\_0}$ with approach of the synchronization point valid up until now by one step decrement $\Delta p_D$.

At point t4, synchronization of the gear clutch S4 is attained and confirmed, so that the associated input shaft 4 is decelerated under the action of set synchronous torque $M_{Sync}$ once again in the direction of the rotational speed $n_{Sync}$ of the output portion of the gear clutch. After the rotational speed difference $\Delta n_{GK}$ falls below a minimal rotational speed difference $\Delta n_{GK\_min}$ established for determination of a synchronous run, which here for example is identical to the minimal rotational speed difference $\Delta n_{GK\_min}$ initially used for recognition of a too-small rotational speed difference $\Delta n_{GK}$, and this has been detected by sensors, the gear setter is moved once again to its neutral position starting from point t5. In this way, the rotational speed $n_{GE}$ of the input shaft 4 once again assumes an amount determined by the effective braking and drag torques. The value $p_{Sync}$ of the adjustment pressure $p_{GK}$ previously set on the gear setter is unchanged, or after deduction of a suitable offset value stored as the current synchronization point $p_{Sync}$, stored, and subsequently used for adaptation of the valid synchronization point.

Based of the comparatively simple control sequences and precisely sensed rotational speed values, the method of the invention to determine the synchronization point $p_{Sync}$ of a gear clutch S4 is relatively fast and accurate. Moreover, only the sensor signals of rotational speed and adjustment parameter sensors already present in any case are used for control of the method process.

Figure 2:
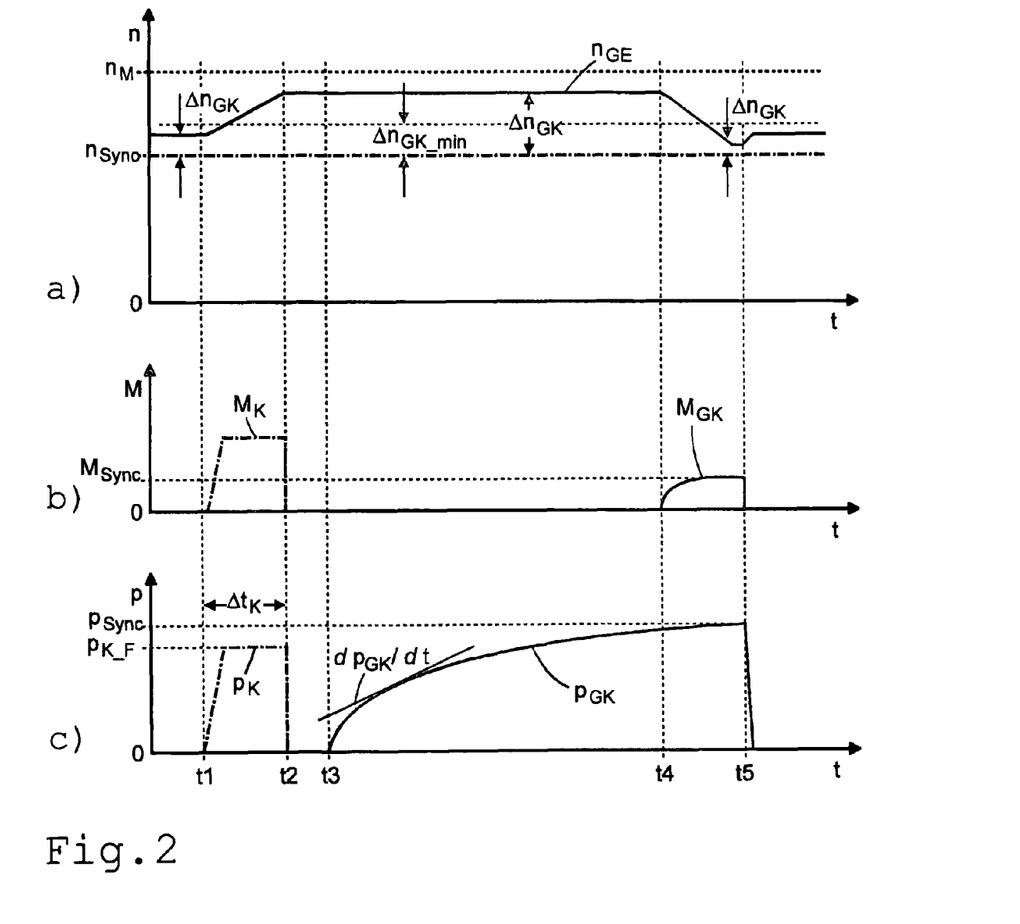
FIG. 2 is a time diagram with rotational seed, torque and adjustment pressure curves according to a second variant of the method of the invention.

In a second variant of the method of the invention, which is represented in FIG. 2 analogously to FIG. 1, the approach of the current synchronization point $p_{Sync}$ of the gear clutch S4 takes place analogously to the control curve of FIG. 4b in a largely continuous, ramp-like increase of the adjustment parameter $p_{GK}$ of the relevant gear setter with an applicable adjustment gradient $dp_{GK}/dt$, whereby the adjustment gradient $dp_{GK}/dt$ of the adjustment parameter $p_{GK}$ is continuously reduced based on a relatively high initial gradient $(dp_{GK}/dt)_0$ with approach to the previously valid synchronization point. In contrast to the stepwise approach of synchronization of the gear clutch S4, the continuous ramp-like motion of the gear setter or the associated shifting rod can be more difficult to control. It can nonetheless lead to a more accurate determination of the synchronization point $p_{Sync}$ with a low adjustment gradient $dp_{GK}/dt$ at the time the synchronization point $p_{Sync}$ is reached.

| Reference numerals | |
| --- | --- |
| 1 | Double clutch transmission |
| 2 | Drive shaft of the drive motor |
| 3 | First input shaft |
| 4 | Second input shaft |
| 5 | Countershaft |
| 6 | Output shaft |
| 7 | Output step |
| G1-G6 | Forward gears |
| K1 | First friction clutch |
| K2 | Second friction clutch |
| M | Drive motor, torque |
| $M_{GK}$ | Friction torque at synchronization of the gear clutch |
| $M_K$ | Clutch torque, torque of the friction clutch |
| $M_{Sync}$ | Sync torque of the gear clutch |
| n | Rotational speed |
| $n_{GE}$ | Rotational speed of the input shaft |
| $n_M$ | Motor rotational speed |
| $n_{Sync}$ | Synchronous rotational speed at the gear clutch |
| p | Pressure |
| $p_{Gk}$ | Adjustment pressure, adjustment parameter of the gear setter |
| $p_K$ | Adjustment pressure, adjustment parameter of the clutch setter |
| $p_{K\_F}$ | Filling pressure of the clutch setter |
| $p_{Sync}$ | Synchronous pressure, synchronizing point of the gear setter |
| R | Reverse gear |
| S1-S4 | Shifting set |
| t | Time |
| r1-t5 | Points in time |
| $(dp/dt)_D$ | Gradient decrement |
| $(dp/dt)_I$ | Impulse gradient |
| $(dp/dt)_R$ | Ramp gradient |
| $dp_{GK}/dt$ | Adjustment gradient |
| $(dp_{GK}/dt)_0$ | Initial adjustment gradient |
| $\Delta n$ | Rotational speed difference |
| $\Delta n_{GK}$ | Rotational speed difference at the gear clutch |
| $\Delta n_{GK\_min}$ | Differential rotational speed threshold |
| $\Delta p$ | Pressure difference |
| $\Delta p_D$ | Step decrement |
| $\Delta p_{St}$ | Step offset |
| $\Delta p_{St\_0}$ | Initial step offset |
| $\Delta t$ | Period of time, time cycle |
| $\Delta t_K$ | Pause (of the friction clutch) |
| $\Delta t_{off}$ | Shut off duration |
| $\Delta t_R$ | Ramp time |
| $\Delta t_{S\_max}$ | Synchronization time (of the gear clutch) |
| $\Delta$ | Duration of pause per engagement step |

The invention claimed is:

1. A method of determining a synchronization point of an automatic double clutch transmission of a motor vehicle comprising two component transmissions each with one input shaft (3, 4) connectable via a friction clutch (K1, K2) to a drive shaft (2) of a drive motor (M) and several gears (G1-G6, R), each shiftable via a friction-synchronized gear clutch (S1-S4), whereby when the drive motor (M) is operating, a current value of the synchronization point of an associated gear setter is determined by approaching synchronization of a gear clutch (S1, S3; S2, S4) and determining a significant change in at least one relevant operating parameter, the method comprising the steps of:

selecting the gear clutch (S1, S3; S2, S4) of a gear (G1, G3, G5; G2, G4, G6, R) of a momentarily load-free component transmission;

moving the associated gear setter to a neutral position;

successively moving the associated gear setter to a shifting position of the selected gear (G1, G3, G5; G2, G4, G6, R) until synchronous running ($\Delta n_{GK} \approx 0$) is attained on the gear clutch (S1, S3; S2, S4) within a threshold;

determining the current synchronization point ($p_{Sync}$) of the gear clutch (S1, S3; S2, S4) from the current adjustment parameter ($p_{GK}$) of the associated gear setter; and adapting a valid synchronization point of the gear clutch (S1, S3; S2, S4) to the current synchronization point ($p_{Sync}$).

2. The method according to claim 1, further comprising the step of determining the current synchronization point ($p_{Sync}$) and adapting the valid synchronization point of the gear clutch (S1, S3; S2, S4) when the motor vehicle is standing still for at least one gear (G1, G3, G5; G2, G4, G6, R) of both component transmissions.

3. The method according to claim 1, further comprising the step of determining the current synchronization point ($p_{Sync}$) and adapting the valid synchronization point of the gear clutch (S1, S3; S2, S4) occur during driving for at least one gear (G1, G3, G5; G2, G4, G6, R) of the momentarily load-free component transmission.

4. The method according to claim 1, further comprising the step of testing a degree of engagement of the associated friction clutch (K1; K2) prior to determination of the current synchronization point ($p_{Sync}$) of the gear clutch (S1, S3; S2, S4), and completely disengaging the relevant friction clutch (K1; K2) in the event of an at least partially engaged state.

5. The method according to claim 1, further comprising the step of testing a shifting state of the relevant component transmission prior to determination of the current synchronization point ($p_{Sync}$) of the gear clutch (S1, S3; S2, S4), and disengaging the relevant gear in the event of an engaged gear (G1, G3, G5; G2, G4, G6, R).

6. The method according to claim 1, further comprising the step of partially engaging the associated friction clutch (K1; K2), prior to determination of the current synchronization point ($p_{Sync}$) of the gear clutch (S1, S3; S2, S4), for a setting of a specifiable minimum rotational speed difference ($\Delta n_{GK\_min}$) at the gear clutch with an applicable degree of engagement ($p_{K\_F}$), and completely disengaging the associated friction clutch (K1; K2) after a pause ($\Delta t_K$).

7. The method according to claim 1, further comprising the step of checking whether there is an applicable minimum rotational speed difference ($\Delta n_{GK\_min}$) on the relevant gear clutch ($\Delta n_{GK} < \Delta n_{GK\_min}$) prior to determination of the current synchronization point ($p_{Sync}$) of the gear clutch (S1, S3; S2, S4), and the associated friction clutch (K1; K2) is only partially engaged and completely disengaged again only when there is a small rotational speed difference ($\Delta n_{GK}$) at the gear clutch ($\Delta n_{GK} < \Delta n_{GK\_min}$) to set the minimal rotational speed difference ($\Delta n_{GK\_min}$).

8. The method according to claim 7, further comprising the step of partially engaging the associated friction clutch (K1; K2) with an applicable degree of engagement ($p_{K\_F}$) and then again completely disengaging the associated friction clutch (K1; K2) when the rotational speed difference ($\Delta n_{GK}$) on the gear clutch (S1, S3; S2, S4) has either reached or exceeded the minimal rotational speed difference ($\Delta n_{GK\_min}$) within a pause ($\Delta t_k$) ($\Delta n_{GK} \geq \Delta n_{GK\_min}$), or when the pause ($\Delta t_K$) has expired.

9. The method according to claim 8, further comprising the step of discontinuing determination of the current synchronization point ($p_{Sync}$) of the gear clutch (S1, S3; S2, S4) when the pause ($\Delta t_K$) has expired either without attaining or exceeding the minimal rotational speed difference ($\Delta n_{GK\_min}$), and increasing the degree of engagement ($p_{K\_F}$) of the associated friction clutch (K1; K2) upon a subsequent determination of the current synchronization point ($p_{Sync}$) of the gear clutch (S1, S3; S2, S4) ($p_{K\_F} = p_{K\_F} + \Delta p_{K\_F}$).

10. The method according to claim 8, further comprising the step of discontinuing determination of the current synchronization point ($p_{Sync}$) of the gear clutch (S1, S3; S2, S4) when the rotational speed difference ($\Delta n_{GK}$) on the gear clutch (S1, S3; S2, S4) has either reached or exceeded the minimal rotational speed difference ($\Delta n_{GK\_min}$) within a pause ($\Delta t_K$), but after that has again fall below the minimum rotational speed difference ($\Delta n_{GK\_min}$) within an established waiting period ($\Delta t_w$), and the associated friction clutch (K1; K2) remains partially engaged during a subsequent determination of the current synchronization point ($p_{Sync}$) of the gear clutch (S1, S3; S2, S4).

11. The method according to claim 1, further comprising the step of specifying the gear clutch (S1, S3; S2, S4) of the gear (G1, G3, G5; G2, G4, G6, R) of the load-free component transmission for determination of the current synchronization point ($p_{Sync}$) for which the last adaptation of the valid synchronization point is the furthest removed in time.

12. The method according to claim 1, further comprising the step of specifying the gear clutch (S1, S3; S2, S4) of the gear (G1, G3, G5; G2, G4, G5, R), which most likely will be engaged as a next gear for shifting reasons, of the load-free component transmission, for determination of a current synchronization point ($p_{Sync}$).

13. The method according to claim 1, further comprising the step of specifying the gear clutch (S1, S3; S2, S4) of the gear (G1, G3, G5; G2, G4, G6, R) whose gear clutch is provided for subsequent determination of a contact point of the associated friction clutch (K1; K2) for determination of a current synchronization point ($p_{Sync}$).

14. The method according to claim 1, further comprising the step of approaching the current synchronization point ($p_{Sync}$) of the gear clutch (S1, S3; S2, S4) in a stepwise increase of the current adjustment parameter ($p_{GK}$) of the associated gear setter with a step offset ($\Delta p_{St}$) and a duration of pause ($\Delta t_{St}$) per engagement step.

15. The method according to claim 1, further comprising the step of approaching the current synchronization point ($p_{Sync}$) of the gear clutch (S1, S3; S2, S4) in a ramping stepwise increase of the current adjustment parameter ($p_{GK}$) of the associated gear setter with a step offset ($\Delta p_{St}$), of pause duration ($\Delta t_{St}$), and a ramp time ($\Delta t_R$) and a ramp gradient (($dp/dt)_R$) per engagement step.

16. The method according to claim 1, further comprising the step of approaching the current synchronization point ($p_{Sync}$) of the gear clutch (S1, S3; S2, S4) takes place in an impulse stepwise increase of the adjustment parameter ($p_{GK}$) of the relevant gear setter with a step offset ($\Delta p_{St}$), a pause duration ($\Delta t_{St}$), an impulse gradient (($dp/dt)_I$), and a shut-off duration ($\Delta t_{off}$) per engagement step.

17. The method according to claim 14, further comprising the step of holding the step offset ($\Delta p_{St}$) of the adjustment parameter ($p_{GK}$) constant in each case for each engagement step until the current synchronization point ($P_{Sync}$) is attained.

18. The method according to claim 14, further comprising the step of reducing the step offset ($\Delta p_{St}$) of the adjustment parameter ($p_{GK}$) based on a relatively high initial step offset ($\Delta p_{St\_0}$) up until determination of the current synchronization point ($p_{Sync}$) per engagement step in each case by a specified step decrement ($\Delta p_D$).

19. The method according to claim 1, further comprising the step of approaching the current synchronization point ($p_{Sync}$) of the gear clutch (S1, S3; S2, S4) in a ramp increase of the adjustment parameter ($p_{GK}$) of the relevant gear setter with an applicable adjustment gradient ($dp_{GK}/dt$).

20. The method according to claim 19, further comprising the step of maintaining the applicable adjustment gradient ($dp_{GK}/dt$) of the adjustment parameter ($p_{GK}$) constant until the synchronization point is determined.

21. The method according to claim 18, further comprising the step of reducing an adjustment gradient ($dp_{GK}/dt$) of the adjustment parameter ($p_{GK}$) until the synchronization point is determined based on a relatively high initial adjustment gradient (($dp_{GK}/dt)_0$) in an applicable time cycle ($\Delta t$) by a specified gradient decrement (($dp/dt)_D$).

22. The method according to claim 1, further comprising the step of discontinuing determination of the current synchronization point ($p_{Sync}$) of the gear clutch (S1, S3; S2, S4) if during movement of the associated gear setter, a specified limit value of the current adjustment parameter ($p_{GK\_max}$) is either attained or exceeded.

23. The method according to claim 1, further comprising the step of discontinuing determination of the current synchronization value ($p_{Sync}$) of the gear clutch (S1, S3; S2, S4) if during movement of the associated gear setter, a specified synchronization time ($\Delta t_{s\_max}$) is either attained or exceeded.

24. The method according to claim 1, further comprising the step of repeating successful determination of the current synchronization point ($p_{Sync}$) of the gear clutch (S1, S3; S2, S4) at least once in a time span, and the determined synchronization point ($p_{Sync}$) is only used for adaptation of the valid synchronization point when the at least two values of the synchronization point ($p_{Sync}$) agree with each other within specified tolerance limits.

25. The method according to claim 14, further comprising the step of reducing, upon repetition of determination of the current synchronization point ($p_{Sync}$) of the gear clutch (S1, S3; S2, S4), the step offset ($\Delta p_{St}$) of the adjustment parameter ($p_{GK}$), at the latest, starting with the last engagement step of the preceding determination of the relevant synchronization point ($p_{Sync}$).

26. The method according to claim 19, further comprising the step of reducing, upon repetition of determination of the current synchronization point ($p_{Sync}$) of the gear clutch (S1, S3; S2, S4), the applicable adjustment gradient ($dp_{GK}/dt$) of the adjustment parameter ($p_{GK}$), at the latest, starting with the last engagement step of the preceding determination of the relevant synchronization point ($p_{Sync}$).

27. The method according to claim 1, further comprising the step of storing a gear-related error message in an error memory, after an applicable number of discontinuations of determination of the current synchronization ($p_{Sync}$) of the same gear clutch (S1, S3; S2, S4), and the relevant gear clutch (S1, S3; S2, S4) is blocked, at least for special functions.

28. The method according to claim 1, further comprising the step of starting determination of the current synchronization point ($p_{Sync}$) of the gear clutch (S1, S3; S2, S4) only when there is a largely stationary operation of the relevant motor vehicle and is discontinued when an event that disturbs or cancels stationary operation occurs.

29. The method according to claim 1, further comprising the step of determining, during driving, a road surface condition using at least one sensor, and that upon recognition of a poor stretch of road, determination of the current synchronization point ($p_{Sync}$) of the gear clutch (S1, S3; S2, S4) is discontinued.

30. The method according to claim 1, further comprising the step of determining simulated travel on a roller test stand, during driving operation, using at least one sensor, and that upon recognition of the roller test stand driving, determination of the current synchronization point ($p_{Sync}$) of the gear clutch (S1, S3; S2, S4) is discontinued.

31. The method according to claim 1, further comprising the step of completely disengaging the friction clutch (K1, K2) after successful determination and after discontinuation of determination of the current synchronization point ($p_{Sync}$), the relevant gear setter is moved to its neutral position, and the previously disengaged gear (G1, G3, G5; G2, G4, G6, R) or a gear requested in the meantime is engaged.

32. The method according to claim 1, further comprising the step of storing an adapted synchronization point of the gear clutch (S1, S3; S2, S4) in parameterized form as a function of a drive gear (G3) engaged in the other component transmission and the selected gear (G4) synchronized to determine the current synchronization point ($p_{Sync}$).

\* \* \* \* \*